(12) United States Patent
Cho et al.

(10) Patent No.: US 6,282,367 B1
(45) Date of Patent: Aug. 28, 2001

(54) SYSTEM DECODER FOR HIGH-SPEED DATA TRANSMISSION AND METHOD FOR CONTROLLING TRACK BUFFERING

(75) Inventors: Chan-Dong Cho, Suwon; Jae-Seong Shim; Jong-Sik Jeong, both of Seoul; Byung-Jun Kim, Suwon, all of (KR)

(73) Assignee: Samsung Electronics Co., Ltd., Suwon-city (KR)

( * ) Notice: Subject to any disclaimer, the term of this patent is extended or adjusted under 35 U.S.C. 154(b) by 0 days.

(21) Appl. No.: 09/007,654

(22) Filed: Jan. 15, 1998

(30) Foreign Application Priority Data

Jan. 21, 1997 (KR) ..................................... 97-1596

(51) Int. Cl.$^7$ ............................... H04N 5/781; H04N 5/83

(52) U.S. Cl. ........................................... 386/126; 386/125

(58) Field of Search .................................. 386/125, 126, 386/109, 111, 112, 124, 46, 64, 27, 33, 40; 360/32, 45; H04N 5/781, 5/83

(56) References Cited

U.S. PATENT DOCUMENTS 5,905,842 * 5/1999 Kajimoto ............................... 386/52

* cited by examiner

Primary Examiner—Robert Chevalier
(74) Attorney, Agent, or Firm—Staas & Halsey LLP

(57) ABSTRACT

A system decoder for high-speed data transmission in an optical disc reproducing apparatus. The system decoder includes a track buffer memory; a first FIFO (first-in, first-out) memory for receiving data descrambled and error-detected and outputting the data by a unit of plural words; a second FIFO memory for receiving data from the track buffer memory and outputting the data by the unit of plural words; and a track buffer controller writing the data in the first FIFO memory into the track buffer memory in a page mode, and reading the data written in the track buffer memory in a page mode to output the read data to the second FIFO memory. The track buffer memory includes a data area into which main data is written; an error information area into which error information for the main data is written; and a microcomputer area into which a microcomputer of the optical disc reproducing apparatus writes data.

27 Claims, 4 Drawing Sheets

SYSTEM DECODER FOR HIGH-SPEED DATA TRANSMISSION AND METHOD FOR CONTROLLING TRACK BUFFERING

BACKGROUND OF THE INVENTION

1. Field of the Invention

The present invention relates to a system decoder for an optical disc reproducing apparatus, and in particular, to a system decoder for a high-speed data transmission and a method for controlling track buffering.

2. Description of the Related Art

After an optical disc technique for reading information recorded on a recording medium by using a laser beam was established about 20 years ago, an optical disc reproducing apparatus such as a laser disc (LD) player or a compact disc (CD) player has come into wide use. Recently, commercialization for an optical disc recording and reproducing apparatus has made rapid advancement. Further, with the development of a shortwave laser and recording/reproducing technique, the density of the optical disc becomes quite high.

On the other hand, a digital image compression technique also has been developed remarkably. In particular, an MPEG2 (Moving Picture Experts Group 2) technique reproduces an image having a quality similar to that of the existing video apparatus, at a data transfer rate of close to 10 Mbps. Further, with the development of an AC-3 audio compression technique for reproducing a multichannel audio signal, one can enjoy audio and multi-sound of high quality at home. It is therefore expected that a digital video (or versatile) disc (DVD), developed under such a technical background, and a DVD-R (DVD-Recordable) will be a function substitute for the existing CD-ROM (Compact Disc-Read Only Memory) as well as the conventional VTR (Video Tape Recorder). As a disc-type recording medium for a digital moving picture, the DVD can record the MPEG2 digital image of over 2 hours, and is suitable for a promising multimedia recording apparatus which can process audio and video signals of high quality.

FIG. 1 illustrates a schematic block diagram of a general DVD reproducing apparatus. In the drawing, as a disc motor 16 rotates at a regular speed to rotate an optical disc 10, an optical pickup 13 having a head 12 picks-up information from the optical disc 10 and converts it into analog RF (Radio Frequency) signal. The optical pickup 13 is driven by a sled pickup motor 14. The analog RF signal is reshaped into a data stream ESM. The data stream ESM from the optical pickup 13 is applied to a digital PLL (Phase Locked Loop) 20 and a system decoder 18. The system decoder 18 performs demodulation, error correction, and descrambling operations with respect to the data steam ESM received from the optical pickup 13. The digital PLL 20 including a phase comparing circuit, a voltage controlled oscillator (VCO), and a frequency divider, generates a first clock synchronized with a signal reproduced from the optical disc 10. A disc driving controller 22 controls a constant linear velocity of the rotation of the disc and other disc related operations, in consideration of frequency servo and phase servo, in accordance with a frame synchronous signal Sf supplied from a synchronous detector (not shown) of the system decoder 18.

A microcomputer 24 performs an overall control operation of the DVD reproducing apparatus according to a control program. For example, the microcomputer 24 generates a transmission control signal in response to a data transmission start signal from an audio/video decoder (hereinafter, referred to as A/V decoder for short) or a ROM decoder 32. A system clock generator 26, which is a crystal oscillator, generates a second clock, i.e., a system clock PLCK to the disc driving controller 22 and an error correction circuit (not shown). Further, the system decoder 18 is coupled to first and second memories 28 ad 30. The first memory 28 is an error correction memory, and is commonly a static RAM (Random Access Memory), and the second memory 30 is a track buffer memory, and is commonly a dynamic RAM. The ROM decoder 32, which is commonly formed in a host computer (e.g., a personal computer), operates according to a control command from the host computer, and transfers the data generated from the system decoder 18 to the host computer based on a specified interfacing technique. A demultiplexer 34 demultiplexes audio and video signals from the system decoder 18 to an AC3/MPEG audio decoder 42 and an MPEG2 video decoder 36, respectively. The video and audio signals are decoded respectively at the video decoder 36 and the audio decoder 42, and transferred to a monitor 40 and a speaker 46 via an NTSC (National Television System Committee) encoder 38 (or a PAL (Phase Alternation Line) encoder) and a digital-to-analog (D/A) converter 44, respectively. The system decoder 18 according to the prior art is illustrated in detail in FIG. 2.

Referring to FIG. 2, the data stream ESM picked up from the optical disc 10 by the head 12 is demodulated by an EFM (Eight-to-Fourteen Modulation) demodulator 100 into an original state, in which the EFM demodulator 100 includes a 32-bit shift register 102 and a 16-to-8 demodulator 104. A synchronous detector 106 detects the frame synchronous signal Sf from an output signal of the 32-bit shift register 102 and provides it to the digital PLL 20. Further, an output of the 16-to-8 demodulator 104 is written into the first memory 28 under the control of an ECC memory controller 108. Afterward, the demodulation data written in the first memory 28 is read out by block units and transferred to an error correction circuit (ECC) 110, under the control of the ECC memory controller 108. The data corrected at the error correction circuit 110 is transferred to a descrambler and error detector 112, under the control of the ECC memory controller 108. A descrambler of the descrambler and error detector 112 descrambles data scrambled during a data encoding process to restore it to the original state, and the error detector of the descrambler and error detector 112 detects an error of the descrambled data. Commonly, the descrambling and the error detection are performed by sector units, and the detected error information is stored into the second memory 30 together with main data MD under the control of a track buffer memory controller 120. The track buffer memory controller 120 generates an acknowledge signal according to a predetermined priority order, in response to a memory access request signal from a buffer write controller 114, a buffer read controller 118, and a microcomputer I/F (intermediate frequency) part 122. The buffer write controller 114 writes an output of the descrambler and error detector 112 into the second memory 30 under the control of the track buffer memory controller 120. The buffer read controller 118 reads out the data written in the second memory 30 and transfers it to an I/F part 126 including an audio/video decoder I/F part and a DVD-ROM I/F, under the control of the track buffer memory controller 120. The microcomputer I/F part 122 interfaces between the system decoder 18 and the microcomputer 24.

A data processing operation of the conventional system decoder 18 includes the steps of receiving the data stream ESM to detect the synchronization and ID (identification) data therefrom, and performing a data demodulation; performing an error detection and correction; and performing a descrambling and error detection for the corrected demodulation data and performing track buffering. In the track buffering operation, the track buffer memory controller 120 generates the acknowledge signal according to a predetermined priority order in response to the memory access request signal generated from the elements 114, 118, and 122, as shown in FIG. 2. Any one of the elements 114, 118 and 122, which has received the acknowledge signal generated from the track buffer memory controller 120, reads or writes the predetermined number of words from/into the second memory 30 for a predetermined time. The main data MD and error information supplied from the descrambler and error detector 112 are written by a word unit (a read/write time for one word is commonly 92 ns). Therefore, if the memory access request signal is simultaneously generated from another element, the element can not normally access the second memory 30, thereby resulting in a delay of the data transmission to the exterior of the system decoder 18.

SUMMARY OF THE INVENTION

It is therefore an object of the present invention to provide a system decoder for high-speed data transmission and a track buffering method for an optical disc reproducing apparatus.

Additional objects and advantages of the invention will be set forth in part in the description which follows and, in part, will be obvious from the description, or may be learned by practice of the invention.

According to an aspect of the present invention, there is provided a system decoder for an optical disc reproducing apparatus. The system decoder includes a track buffer memory; a first FIFO (first-in, first-out) memory for receiving data descrambled and error-detected and outputting the data by a unit of plural words; a second FIFO memory for receiving data from the track buffer memory and outputting the data by the unit of plural words; and a track buffer controller writing the data in the first FIFO memory into the track buffer memory in a page mode, and reading the data written in the track buffer memory in a page mode to output the read data to the second FIFO memory. The track buffer memory includes a data area into which main data is written; an error information area into which error information for the main data is written; and a microcomputer area into which a microcomputer of the optical disc reproducing apparatus writes data.

According to another aspect of the present invention, there is provided a method for controlling track buffering of an optical disc reproducing apparatus including a system decoder which has a track buffer memory and a FIFO memory for accessing the track buffer memory in a page mode. The method includes the steps of generating an acknowledge signal in response to a memory access request signal; and if the memory access request signal is simultaneously received from a plurality of elements, generating by turn the acknowledge signal to the elements each according to a predetermined priority order.

BRIEF DESCRIPTION OF THE DRAWINGS

The above and other objects, features and advantages of the present invention will become more apparent in the light of the following detailed description of an exemplary embodiment thereof taken with the attached drawings in which.

DETAILED DESCRIPTION OF THE PREFERRED EMBODIMENT

Figure 1:
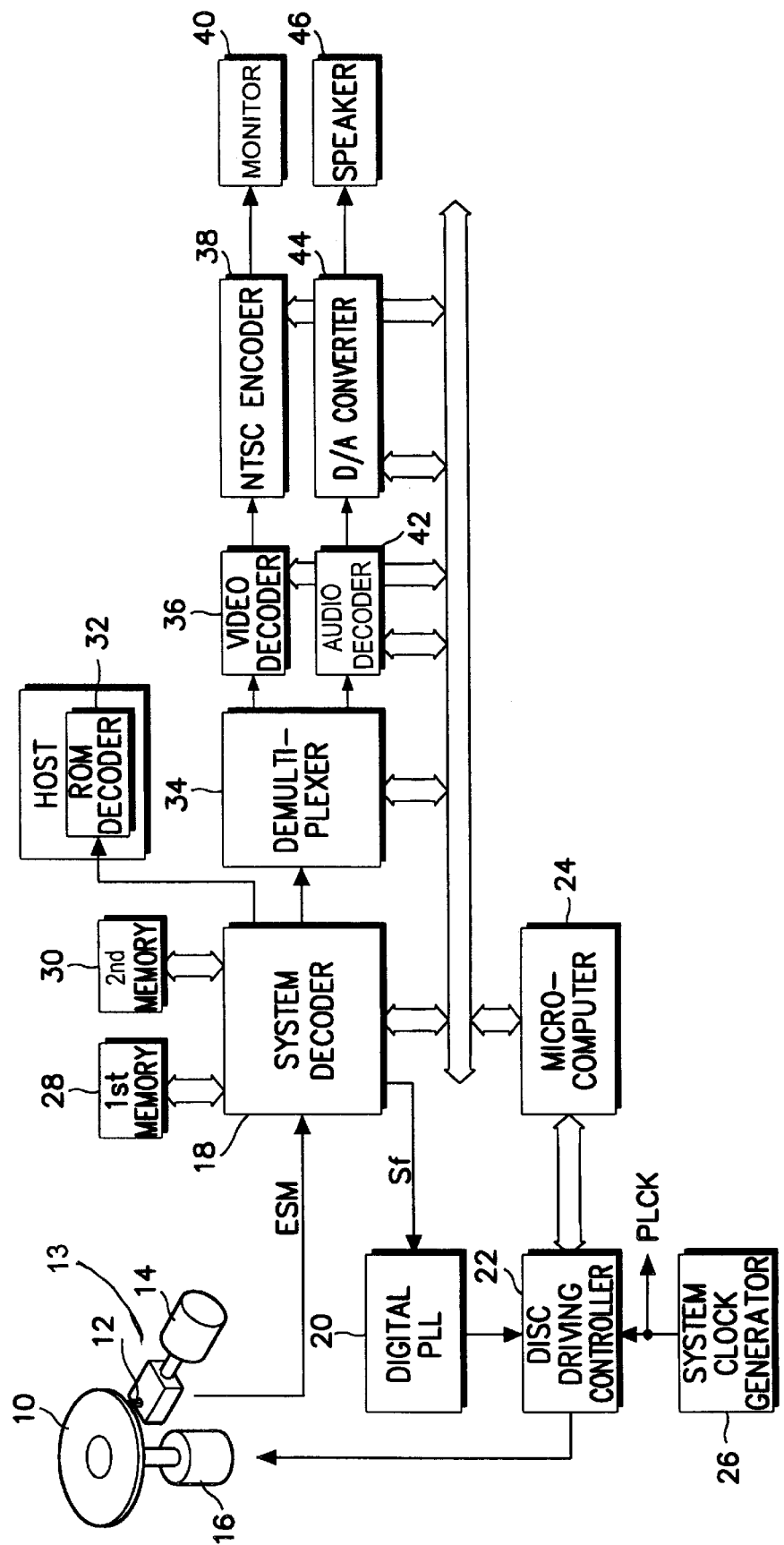
FIG. 1 is a schematic block diagram of a general DVD reproducing apparatus.

A preferred embodiment of the present invention will be described in detail referring to the attached drawings, in which like reference numerals denote the same elements in the drawings, for understanding. Though the specific embodiment will be exemplarily defined and described in detail to clarify the subject matter of the present invention, the present invention may be implemented with the description of the present invention by those skilled in the art even without the details. In addition, an unnecessary detailed description of widely known functions and constructions may be avoided here.

Figure 2:
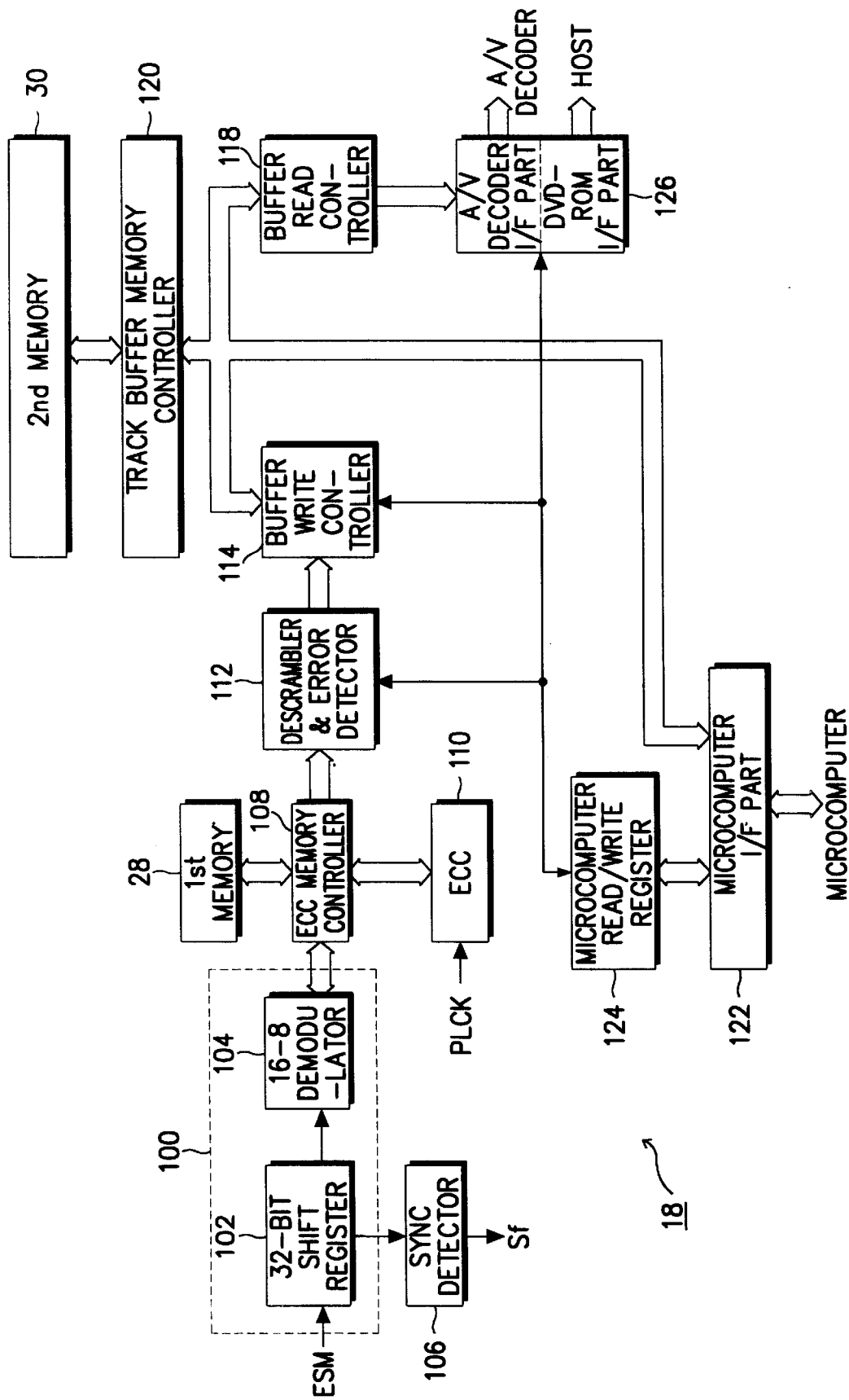
FIG. 2 is a detailed block diagram of a system decoder shown in FIG. 1.
Figure 3:
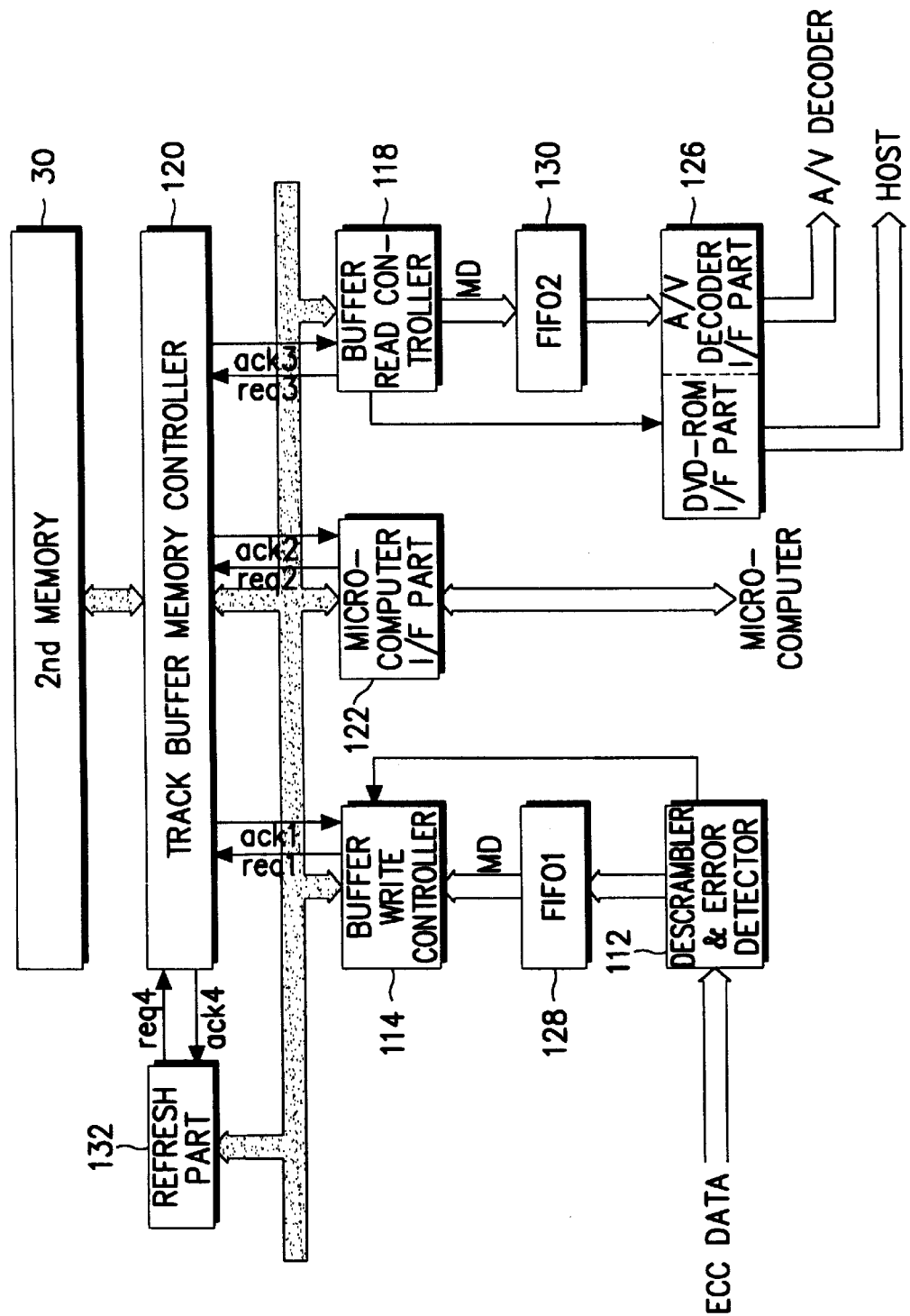
FIG. 3 is a block diagram showing a track buffering part of a DVD reproducing apparatus according to a preferred embodiment of the present invention.
Figure 4:
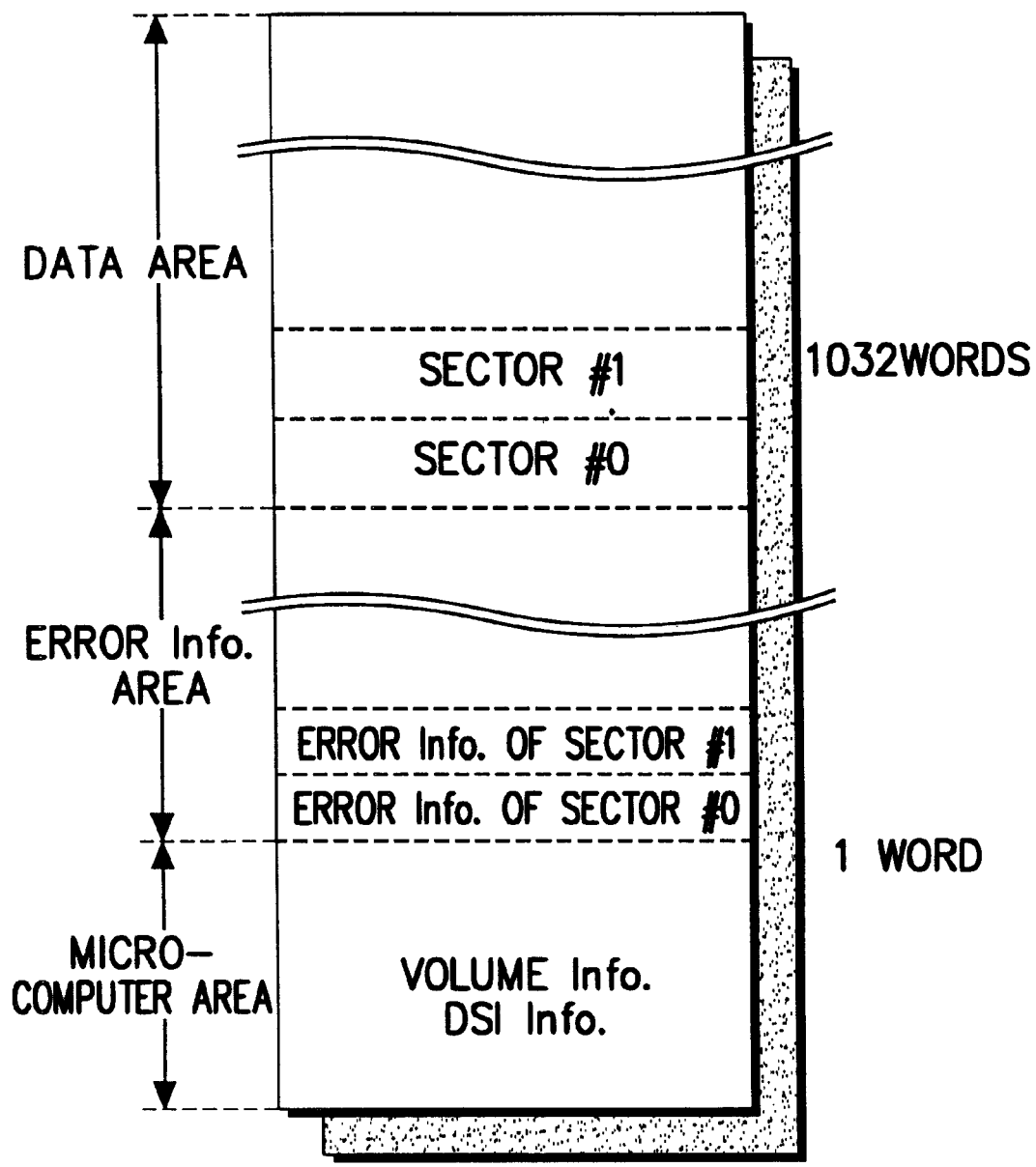
FIG. 4 is a diagram showing a memory map of a second memory shown in FIG. 3.

FIG. 3 illustrates a block diagram of a track buffering part according to a preferred embodiment of the present invention, and FIG. 4 shows a memory map of a second memory 30 (i.e., track buffer memory) of FIG. 3. As illustrated in FIG. 3, the track buffering part according to the present invention includes a first FIFO (First-In, First-Out) memory 128 connected between a buffer write controller 114 and a descrambler and error detector 112, and a second FIFO memory 130 connected between a buffer read controller 118 and an I/F part 126 which includes an A/V decoder I/F part and a DVD-ROM I/F part. It is noted that the remaining elements of the track buffering part of FIG. 3 are identical to that of the conventional track buffering part of FIG. 2. The first FIFO memory 128 receives main data MD from the descrambler and error detector 112 and outputs it on the basis of first-in-first-out. Similarly, the second FIFO memory 130 receives the main data MD from the second memory 30 and outputs it on the basis of first-in-first-out. In order to increase the number of the accesses to the track buffer (second) memory 30, which is a dynamic RAM, within a predetermined time, it is preferable to access the dynamic RAM in a page mode, if possible. In case of accessing the dynamic RAM in a page mode, if the data to be read/written at a time increases in amount, the first and second FIFO memories 128 and 130 should also increase in capacity. Thus, in order to prevent an excessive increase of the FIFO memories 128 and 130 in capacity, the number of words to be accessed at a time is limited to 8 according to the preferred embodiment of the present invention.

In the meantime, the second memory 30 reads/writes the main data MD by sector units. Similarly, error information is also generated by sector units. In light of the foregoing, the second memory 30 is configured to have a data area, an error information area, and a microcomputer area, as shown in FIG. 4. The data area into which the main data MD is to be written has a capacity of writing 1032 words (1 sector= 2064 bytes). The error information area uses one word for writing therein the error information of one main data sector. That is, the error information for an n-th sector in the data area is written in an n-th word in the error information area. Actually, though it is possible to express the error information by using one bit, the embodiment has expressed it by the word unit for the convenience in reading/writing the error information. The microcomputer area is an area from/into which the microcomputer can read and write data.

As illustrated in FIG. 3, the second memory 30 can be accessed by the buffer write controller 114, the buffer read controller 118, a microcomputer I/F part 122, and a refresh part 132. In case two or more out of the elements 114, 118, 122 and 132 generate memory access request signals req1–req4 simultaneously, the track buffer memory controller 120 generates an acknowledge signal ack1–ack4 to the element having the higher priority. Then, the element which has received the acknowledge signal can access the second memory 30.

Now, referring to FIGS. 3 and 4, the track buffering control process will be described. The corrected main data MD is processed at the descrambler and error detector 112 by sector units. The main data and error information output from the descrambler and error detector 112 are written into the data area and the error information area of the second memory 30, respectively. In case of a X4-speed DVD reproducing apparatus, 1033 words (main data (1032 words)+error information (1 word)) should be written into the second memory 30 per 358 µs. Further, it takes 266 ns to write the main data MD in the first FIFO memory 128 into the second memory 30 at a time in the page mode. However, actually, it takes 287 ns, since a control signal for the second memory 30 is generated by using the system clock PLCK as a main clock. Therefore, since the main data MD for one sector is 1032 words, the page mode write operation should be performed 129 times every 2.775 µs. The error information for one word is written into one sector, and the time required for separately writing one word is 92.6 ns. Accordingly, the time required for writing the data of one sector and the error information is 37.116 µs as expressed by the following Equation (1).

$$287 \text{ ns} \times 129 + 92.6 \text{ ns} = 37.116 \text{ µs} \tag{1}$$

Now, a process for reading the main data MD and the error information will be described. First, when transmitting the data written in the second memory 30 to the exterior in a PIO4 mode, the maximum transfer rate should be over 16.5 Mbps. In order to increase the maximum transfer rate up to 20 Mbps, the data of 7160 types should be read per 358 µs which is identical to the time required for writing the data of one sector into the second memory 30. Accordingly, if 8 words are read at a time in the page mode read operation, the page mode read operation should be performed 448 times. Thus, in order to satisfy the maximum transfer rate of 20 Mbps, the page mode read operation should be performed every 779 ns. Further, when the data is transmitted at the maximum transfer rate of 20 Mbps, the time for accessing the second memory 30 becomes 128.668 µs as expressed by the following Equation (2).

$$287 \text{ ns} \times 448 + 92.6 \text{ ns} = 128.668 \text{ µs} \tag{2}$$

That is, in the page mode read operation, if the data is read by 8 words, 287 ns is required for one cycle of the page read operation, so that the page mode read operation is performed every 779 ns at the transfer rate of 20 Mbps. That is, since one page mode read cycle requires 287 ns, every read cycle has an empty time of 492 ns. Such an empty time is enough to perform one cycle of the page mode write operation, one cycle of a single word access, and one cycle of refresh operation. Therefore, even if the memory access request signals req1–req4 are simultaneously generated from the four elements 114, 118, 122 and 132, the track buffer memory controller 120 can control the second memory 30 without an error.

Now, a process for accessing the second memory 30 will be described. The microcomputer 24 can use the second memory 30 as an auxiliary memory. That is, the microcomputer 24 accesses the second memory 30 to write and read volume information or DSI information from/into a desired area. The microcomputer 24 normally reads/writes the data by the word or byte unit, and occasionally an amount of the data to be read/written per unit time may be changed. In other words, the amount of the data which can be accessed decreases at an interval where the page mode read operation and the page mode write operation are consecutively performed. Further, if the second memory 30 is accessed by a fewer number of the elements 114, 118, 122 and 132, the chances of accessing the second memory 30 increases. However, if the microcomputer 24 accesses the second memory 30 once within at least 779 ns, the second memory 30 can read/write the data of 448 words within 358 ns even in the case the second memory 30 is the most frequently accessed. In this manner, the system decoder according to the present invention reads/writes data in the page mode by using the FIFO memories, so that the transfer rate may be enhanced up to 20 Mbps, exceeding the transfer rate of 16.5 Mbps required in the PIO4 mode.

As can be appreciated from the foregoing, the system decoder for a DVD reproducing apparatus according to the present invention includes the FIFO memories to perform the read/write operation in the page mode, thereby transmitting the data at high speed.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed:

1. A system decoder for an optical disc reproducing apparatus for reproducing data recorded on an optical disc, the system decoder comprising:

a track buffer memory;

a first FIFO (first-in, first-out) memory which receives descrambled and error-detected data and outputs the data by a unit of plural words;

a second FIFO memory which receives data from the track buffer memory and outputs the data by the unit of plural words; and a track buffer controller which writes the data in the first FIFO memory into said track buffer memory in a page mode, and reads the data written in the track buffer memory in a page mode to output the read data to the second FIFO memory.

2. The system decoder as claimed in claim 1, wherein the track buffer memory comprises:

a data area into which main data is written;

an error information area into which error information for the main data is written; and a microcomputer area into which a microcomputer of the optical disc reproducing apparatus writes data.

3. The system decoder as claimed in claim 2, wherein the optical disc is a digital video disc.

4. A method for controlling track buffering of an optical disc reproducing apparatus including a system decoder which has a track buffer memory and a FIFO memory for accessing said track buffer memory in a page mode, said method comprising the steps of:

generating an acknowledge signal in response to a memory access request signal; and if said memory access request signal is simultaneously received from a plurality of elements, generating in turn the acknowledge signal to said elements each according to a predetermined priority order.

5. An optical disc reproducing apparatus for reproducing data recorded on an optical disc, the optical disc reproducing apparatus comprising:

a first memory which stores the data subsequent to being descrambled and error corrected;

a first FIFO (first-in, first-out) memory which receives and stores the descrambled and error corrected data, and transmits the stored descrambled and error corrected data to the first memory in a page write mode;

a second FIFO (first-in, first-out) memory which receives and stores the descrambled and error corrected data stored in the first memory in a page read mode; and a controller which writes the descrambled and error corrected data from the first FIFO to the first memory, and reads the descrambled and error corrected data from the first memory to the second FIFO.

6. The optical disc reproducing apparatus as claimed in claim 5, wherein the first memory is a track buffer memory.

7. The optical disc reproducing apparatus as claimed in claim 6, wherein the track buffer memory is a dynamic random access memory (DRAM).

8. The optical disc reproducing apparatus as claimed in claim 5, wherein:

the first FIFO writes the descrambled and error corrected to the first memory in sector units comprising a plurality of words; and the second FIFO reads the descrambled and error corrected from the first memory in sector units comprising a plurality of words.

9. The optical disc reproducing apparatus as claimed in claim 8, wherein a maximum number of the plurality of words to write the descrambled and error corrected data to the first memory and to read the descrambled and error corrected data from the first memory is 8.

10. The optical disc reproducing apparatus as claimed in claim 5, wherein the first memory comprises:

a data area to store main data of the descrambled and error corrected data; and an error information area to store error information associated with the main data.

11. The optical disc reproducing apparatus as claimed in claim 10, wherein the data area stores the main data in sector units, and the error information area stores the error information in words corresponding to the sector units.

12. The optical disc reproducing apparatus as claimed in claim 5, further comprising a refresh part to perform a refresh operation during each page mode read operation.

13. The optical disc reproducing apparatus as claimed in claim 11, further comprising a refresh part to perform a refresh operation during each page mode read operation.

14. The optical disc reproducing apparatus as claimed in claim 5, further comprising:

a microprocessor to read and write information into the first memory; and a refresh part to perform a refresh operation during each page mode read operation;

wherein each of the page read mode cycles includes an empty time during which the first FIFO performs the page mode write operation, the microprocessor accesses the first memory and the refresh part performs the refresh operation.

15. The optical disc reproducing apparatus as claimed in claim 10, further comprising:

a microprocessor to read and write information into the first memory; and a refresh part to perform a refresh operation during each page mode read operation;

wherein the first memory comprises a microcomputer area, each of the page read mode cycles includes an empty time during which the first FIFO performs the page mode write operation, the microprocessor accesses the first memory and the refresh part performs the refresh operation, and the microprocessor accesses the first memory to write and read volume information or DSI information into the microcomputer area.

16. An optical disc reproducing apparatus for reproducing data recorded on an optical disc, comprising:

a first memory to store the data subsequent to being descrambled and error corrected; and a plurality of elements to access the first memory and request the access by corresponding memory access request signals; and a buffer controller to determine whether at least two of the plurality of elements generates the corresponding memory access request signals simultaneously, to assign priorities to the simultaneously generated memory access request signals, and to generate acknowledgment signals to the at least two of the plurality of elements which generate the simultaneous memory access request signals, according to the priorities, such that the acknowledgment signals enable access to the first memory.

17. The optical disc reproducing apparatus as claimed in claim 16, wherein the plurality of elements comprises:

a first FIFO (first-in, first-out) memory to receive and store the descrambled and error corrected data, and to transmit the stored descrambled and error corrected data to the first memory in a page write mode; and a second FIFO (first-in, first-out) memory to receive and store the descrambled and error corrected data stored in the first memory in a page read mode.

18. The optical disc reproducing apparatus as claimed in claim 17, wherein the plurality of elements further comprises:

a microprocessor to read and write information into the first memory; and a refresh part to perform a refresh operation during each page mode read operation.

19. The optical disc reproducing apparatus as claimed in claim 18, wherein each of the page read mode cycles includes an empty time during which the first FIFO performs the page mode write operation, the microprocessor accesses the first memory and the refresh part performs the refresh operation.

20. A method for controlling track buffering of an optical disc reproducing apparatus, the method comprising:

storing descrambled and error corrected data in a first FIFO (first-in, first-out) memory;

storing the descrambled and error corrected data from the first FIFO in a first memory; and storing the descrambled and error corrected data from the first memory in a second FIFO.

21. The method as claimed in claim 20, wherein:

the storing of descrambled and error corrected data from the first FIFO memory comprises performing a page mode write operation to store the descrambled and error corrected data in the first memory; and the storing of descrambled and error corrected data from the first memory comprises performing a page mode read operation to read the descrambled and error corrected data from the first memory.

22. The method as claimed in claim 21, further comprising performing a refresh operation of the first memory during each page operation.

23. A method of controlling track buffering of an optical disc reproducing apparatus in which a plurality of elements access a track buffer memory, the method comprising:
   determining whether at least two of the plurality of elements simultaneously request access to the track buffer memory; and
   assigning a priority order of access to each of the at least two of the plurality of elements simultaneously requesting access.

24. The method as claimed in claim 23, further comprising:
   storing data read from an optical disc in a first FIFO (first-in, first-out) memory;
   storing the data stored in the first FIFO into the track buffer memory; and
   storing the data stored in the track buffer memory in a second FIFO memory.

25. The optical disc reproducing apparatus as claimed in claim 5, further comprising a microcomputer which accesses the first memory as an auxiliary memory.

26. The optical disc reproducing apparatus as claimed in claim 25, wherein the microcomputer accesses the first memory at a rate so that a maximum amount of data which can be accessed by the microcomputer from the first memory is not decreased at an interval where the page mode read operation and page mode write operation are consecutively performed.

27. A method of accessing a track buffer memory as an auxiliary memory by a microcomputer in an optical disc reproducing apparatus which controls track buffering by storing descrambled and error corrected data in a first FIFO (first-in, first-out) memory, storing the descrambled and error corrected data from the first FIFO in the track buffer memory in a page write mode, reading the storing the descrambled and error corrected data from the track buffer memory in a page read mode and storing the descrambled and error corrected data in a second FIFO, the method comprising:
   limiting the accessing of the track buffer memory by the microcomputer to predetermined intervals so that a maximum amount of data which can be accessed by the microcomputer from the track memory is not decreased at an interval where the page mode read operation and page mode write operation are consecutively performed.

* * * * *